(12) United States Patent
Druxman (10) Patent No.: US 11,716,969 B2
(45) Date of Patent: Aug. 8, 2023

(54) ANIMAL LEASH WITH LONGITUDINALLY ADJUSTABLE GRIP HANDLE

(71) Applicant: LILY LEASH HOLDINGS, CORP., Winnipeg (CA)

(72) Inventor: Gregg Druxman, Winnipeg (CA)

( * ) Notice: Subject to any disclaimer, the term of this patent is extended or adjusted under 35 U.S.C. 154(b) by 46 days.

(21) Appl. No.: 17/208,031

(22) Filed: Mar. 22, 2021

(65) Prior Publication Data

US 2021/0360902 A1 Nov. 25, 2021

Related U.S. Application Data

(60) Provisional application No. 63/029,615, filed on May 25, 2020.

(51) Int. Cl.
*A01K 27/00* (2006.01)

(52) U.S. Cl.
CPC .................................. *A01K 27/003* (2013.01)

(58) Field of Classification Search
CPC ...................................................... A01K 27/003
See application file for complete search history.

(56) References Cited

U.S. PATENT DOCUMENTS

| | | | | |
|---|---|---|---|---|
| 4,192,505 A * | 3/1980 | Tabickman | ............ | A63B 49/10 473/536 |
| 4,892,063 A * | 1/1990 | Garrigan | .............. | A01K 27/003 119/795 |
| 5,348,360 A * | 9/1994 | Mencarelli | ............... | B25G 1/10 74/551.9 |
| 5,915,336 A * | 6/1999 | Watson | ................. | A01K 27/003 119/797 |
| 6,092,442 A * | 7/2000 | Macor | .................... | B25G 1/063 81/177.1 |
| 6,199,460 B1 * | 3/2001 | Lo | ........................... | B29C 70/72 81/177.1 |
| 6,220,128 B1 * | 4/2001 | Hu | .......................... | B25G 1/01 81/22 |
| 6,277,040 B1 * | 8/2001 | Randolph | .............. | A63B 60/16 473/568 |
| 6,397,783 B1 * | 6/2002 | Koch | .................... | A01K 27/002 119/856 |
| 6,450,129 B1 * | 9/2002 | Flynn | ................... | A01K 27/003 119/770 |
| 6,453,851 B1 | 9/2002 | Holt, Jr. et al. | | |

(Continued)

*Primary Examiner* — Joshua D Huson
*Assistant Examiner* — Edgar Reyes
(74) *Attorney, Agent, or Firm* — Ryan W. Dupuis; Kyle R. Satterthwaite; Ade & Company Inc.

(57) ABSTRACT

An animal leash has a flexible line extending from a connector that attaches to the animal. A grip handle is supported for sliding at an intermediate location along the line. The grip handle has a main body with a leash passage receiving the line therethrough and an outer surface for gripping in a hand of a user. Two cavities formed within the main body at a location between one of the major surfaces of the leash passage and the outer surface so as to define a material bridge extending radially outward from the major surface to the outer surface whereby a radially compressive force applied to the outer surface is transferred through the material bridge to the major surface of the passage so as to collapse the passage and grip the line to prevent sliding of the grip handle along the line when applying compressive force.

17 Claims, 4 Drawing Sheets

(56) References Cited

U.S. PATENT DOCUMENTS

| | | | |
|---|---|---|---|
| 6,460,488 B1* | 10/2002 | Manzella | F16G 11/048 |
| | | | 119/769 |
| 6,827,045 B1 | 12/2004 | Willner et al. | |
| 7,487,788 B2* | 2/2009 | Baker | A61H 3/0288 |
| | | | 135/69 |
| 7,877,843 B2* | 2/2011 | Holland-Letz | B25G 1/105 |
| | | | 16/436 |
| 8,413,613 B1* | 4/2013 | Smith | A01K 27/00 |
| | | | 119/797 |
| 8,955,197 B2* | 2/2015 | Bailey | A45C 13/22 |
| | | | 16/428 |
| 9,737,055 B2* | 8/2017 | Craig | A01K 27/008 |
| 11,110,585 B2* | 9/2021 | Lombardi | B29C 45/1676 |
| 11,240,993 B2* | 2/2022 | McBounds | F21V 33/0004 |
| 2006/0027189 A1 | 2/2006 | Luber | |
| 2006/0102103 A1* | 5/2006 | Fountoulakis | A01K 27/003 |
| | | | 119/795 |
| 2007/0039562 A1* | 2/2007 | Carter | A01K 27/005 |
| | | | 119/798 |
| 2011/0283956 A1* | 11/2011 | Silva | A01K 27/002 |
| | | | 119/797 |
| 2012/0013140 A1* | 1/2012 | Nitkin | A45C 13/26 |
| | | | 16/428 |
| 2013/0092101 A1* | 4/2013 | Sylvanowicz | A01K 27/003 |
| | | | 119/795 |
| 2015/0053145 A1* | 2/2015 | Miksovsky | A01K 27/005 |
| | | | 29/428 |
| 2015/0306445 A1* | 10/2015 | Storum | A63B 21/4035 |
| | | | 16/110.1 |
| 2017/0347629 A1* | 12/2017 | Lee | A01K 27/005 |
| 2018/0007868 A1* | 1/2018 | Knight | E01H 1/1206 |
| 2019/0118367 A1* | 4/2019 | Davis | B25G 1/01 |
| 2021/0076641 A1* | 3/2021 | DeRosa | A01K 27/002 |
| 2021/0120785 A1* | 4/2021 | Wong | A01K 27/003 |
| 2022/0104461 A1* | 4/2022 | Kirkham | A01K 27/004 |

* cited by examiner

ANIMAL LEASH WITH LONGITUDINALLY ADJUSTABLE GRIP HANDLE

This application claims the benefit under 35 U.S.C.119(e) of U.S. provisional application Ser. No. 63/029,615, filed May 25, 2020.

FIELD OF THE INVENTION

The present invention relates to a leash for restraining an animal, and more particularly the present invention relates to a leash in which a grip handle is slidable along a length of the leash to provide comfortable gripping of the leash at an intermediate location along the length of the leash.

BACKGROUND

A common structure of an animal leash includes an elongate flexible line connected between a clasp at a first end of the line for attachment to a collar or harness worn by the animal and a gripping loop at a second end of the line for gripping in a first hand of the user. For additional control and/or restraint of the animal, in some instances a grip handle is provided at an intermediate location along the line of the leash as described in U.S. Pat. No. 6,453,851 by Holt Jr. et al; U.S. Pat. No. 6,827,045 by Willner et al; and United States Patent Application Publication No. 2006/0027189 by Luber.

The degree of grip in prior art devices is difficult to control because if the grip is too light, the grip will slide along the line rather than restrain the animal, whereas if the grip is too firm, the grip cannot be readily adjusted along the lead to a desired gripping location. A need exists to improve upon prior art devices to achieve both (i) ease of sliding of the grip along the line of the leash when adjusting the grip, and (ii) adequate gripping force to grip the line when restraining the animal.

SUMMARY OF THE INVENTION

According to one aspect of the invention there is provided an animal leash for gripping by a user to restrain an animal, the assembly leash comprising:

a flexible line extending in a longitudinal direction of the line between a first end and a second end;

a connector mounted on the first end of the flexible line for attachment to the animal;

a grip handle supported on the flexible line at an intermediate location between the first end and the second end of the flexible line, the grip handle comprising:

a main body which is elongate in the longitudinal direction of the flexible line between opposing ends of the main body;

the main body being formed of a resilient material;

the main body including an outer surface arranged to be gripped in a hand of the user;

a leash passage extending longitudinally through the main body between the opposing ends of the grip handle and receiving the flexible line extending longitudinally therethrough;

the leash passage having a first major inner surface and a second major inner surface in close proximity with opposing sides of the flexible line respectively;

two cavities formed within the main body at a location between the first major inner surface of the leash passage and a portion of the outer surface of main body so as to define a material bridge extending radially outward from the first major inner surface to said portion of the outer surface;

whereby a radially compressive force applied to the outer surface of the main body is transferred through the material bridge to the first major inner surface so as to collapse the first major inner surface of the leash passage towards the second major inner surface of the leash passage to grip the flexible line between the first and second major inner surfaces of the leash passage.

The animal leash described herein uses friction between the internal surfaces of the rubber handle and the flexible line of the leash to securely grip the handle relative to the flexible line of the leash. The bridge of material between the cavities focuses a gripping force applied to the outer surface of the grip handle to readily collapsed the major inner surfaces of the leash passage about the flexible line of the leash without requiring an excessive grip force to be applied.

According to a preferred embodiment, the grip handle is made of a type of rubber that has a strong abrasion resistance and that provides enough friction to stop the leash from slipping and sliding when no force is applied to the channel. In one embodiment, the innovative handle design features 4 symmetrical holes bored through it from end to end. The holes are adjacent the flat channel where the leash ribbon feeds through it. The 4 holes minimize the force required to collapse the leash passage about the flexible line of the leash when the grip handle is squeezed by the user such that the squeezing force is readily transferred to grip both broad sides of the leash. The flat channel ensures that there is no twisting or rotation of the control handle along the axis of the leash. The holes also increase the flexibility of the handle to be bent/deformed slightly when squeezed and engaged which also increases the braking performance of the handle.

The cavities are preferably elongate in the longitudinal direction. The cavities preferably span across at least a central portion of the main body which is centrally located between the opposing ends of the main body. More preferably, the cavities span a majority of a length or the full length of the grip handle in the longitudinal direction. The cavities may be open to one or both of the opposing ends of the main body.

The bridge of material between the two cavities may be laterally centered relative to the first major inner surface.

The leash may further comprise two additional cavities formed within the main body at a location between the second major inner surface of the leash passage and a second portion of the outer surface of main body so as to define a second material bridge extending radially outward from the second major inner surface to said second portion of the outer surface, whereby a second radially compressive force applied to said second portion of the outer surface of the main body is transferred through the second material bridge to the second major inner surface so as to collapse the second major inner surface of the leash passage towards the first major inner surface of the leash passage to grip the flexible line between the first and second major inner surfaces of the leash passage.

The leash passage is preferably rectangular in cross section such that the first and second major inner surfaces are parallel to one another. In this instance, the flexible line may be a flat ribbon having flat surfaces at said opposing sides of the flexible line in which the flat surfaces have a width in a lateral direction which is approximately equal to a width of the major inner surfaces of the leash passage.

The outer surface of the main body may be circular in cross section perpendicular to the longitudinal direction.

The cavities may be circular in cross section perpendicular to the longitudinal direction.

The main body may be formed of rubber.

Preferably the resilient material of the main body has a durometer measured on the Shore A Scale of between 60 and 70, and more preferably has a durometer measured on the Shore A Scale of approximately 65.

The resilient material of the main body preferably has a coefficient of friction relative to the flexible line of between 0.25 and 0.75.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Referring to the accompanying figures, there is illustrated an animal leash generally indicated by reference numeral 10. The animal leash 10 is suited for connection to a collar or harness secured about the animal for restraining and controlling the animal.

The animal leash 10 generally comprises (i) a flexible line 12 extending in a longitudinal direction of the line between a first end 14 of the line for attachment to the animal and a second end 16 of the line for gripping in a first hand of a user, (ii) a connector 18 mounted on the first end of the line 12, and (iii) a grip handle 20 supported on the flexible line 12 at an intermediate location between the first end and the second end of the flexible line so as to be longitudinally slidable along the line to adjust a position of the grip handle 20 in the longitudinal direction of the line, wherein the grip handle 20 can be gripped in a second hand of the user.

The flexible line 12 is a woven material formed as a flat ribbon having two flat opposing surfaces 22 spanning longitudinally along the length of the line and spanning in a lateral direction that is perpendicular to the longitudinal direction between two opposing side edges of the line. The flat opposing surfaces 22 define the width of the line in the lateral direction. At the second end 16 of the line, the flat ribbon is folded back onto itself and stitched to itself to form a closed anchor loop 24 that defines a grip for the first hand of the user.

The connector 18 at the first end of the flexible line includes a hook with a latch element that is movable and biased relative to the hook from an open position allowing a ring from a collar or harness to be received in the hook and a closed position forming a closed loop with the hook to retain the ring within the hook. The connector 18 may further include a swivel between the hook and a mounting loop at the base of the connector. The ribbon material of the line 12 is threaded through the mounting loop at the base of the connector 18 and is folded back onto itself and stitched to itself to form a closed loop that is secure relative to the mounting loop of the connector 18.

The grip handle 20 includes a main body 26 formed as a single moulded piece of a uniform resilient rubber material which is continuous and seamless throughout the main body. The main body is elongate in a longitudinal direction of the grip handle between a first end 28 and an opposing second end 30 of the grip handle. End surfaces of the main body at the first end 28 and the second end 38 are rounded and slightly convex in shape while being opposite one another to define an overall length of the grip handle therebetween in the longitudinal direction.

A leash passage 32 extends longitudinally through the main body between openings centrally located in the end surfaces at both of the opposing ends of the grip handle so as to receive the flexible line 12 extending therethrough for alignment of the longitudinal direction of the grip handle with the longitudinal direction of the flexible line.

The main body 26 of the grip handle has an outer surface 33 that is generally cylindrical in shape and which is suitably sized for gripping in a single hand of the user. The cross section of the main body perpendicular to the longitudinal direction is thus circular with the diameter varying slightly so as to be larger in diameter at the longitudinal centre of the grip handle while tapering to reduce slightly in diameter towards each of the opposing ends 28 and 30 of the grip handle. An end flange 34 is located at each of the opposing ends 28 and 30 of the main body in which the outer diameter of the outer surface 33 is increased again to define a radially protruding rib relative to the remainder of the outer surface 33 which extends about the full circumference of the main body.

The leash passage 32 extends longitudinally through the grip handle so as to be open to the exterior at both ends for receiving the flexible line 12 extending therethrough. The leash passage is generally rectangular in cross-sectional shape perpendicular to the longitudinal direction so as to match the shape and size of the flexible line 12 extending therethrough. More particularly, the leash passage includes first and second major inner surfaces 36 and 38 which are parallel and spaced apart from one another by a thickness of the leash passage corresponding to the thickness of the line between the two flat surfaces 22 thereof. The major inner surfaces 36 and 38 span a width in the lateral direction which is approximately equal to the width of the flat surfaces 22 of the flexible line 12. The leash passage 32 further includes two minor inner surfaces 40 and 42 connected between the major inner surfaces at laterally opposing sides thereof to span the thickness of the leash passage 32 and the line 12 extending therethrough.

Figure 1:
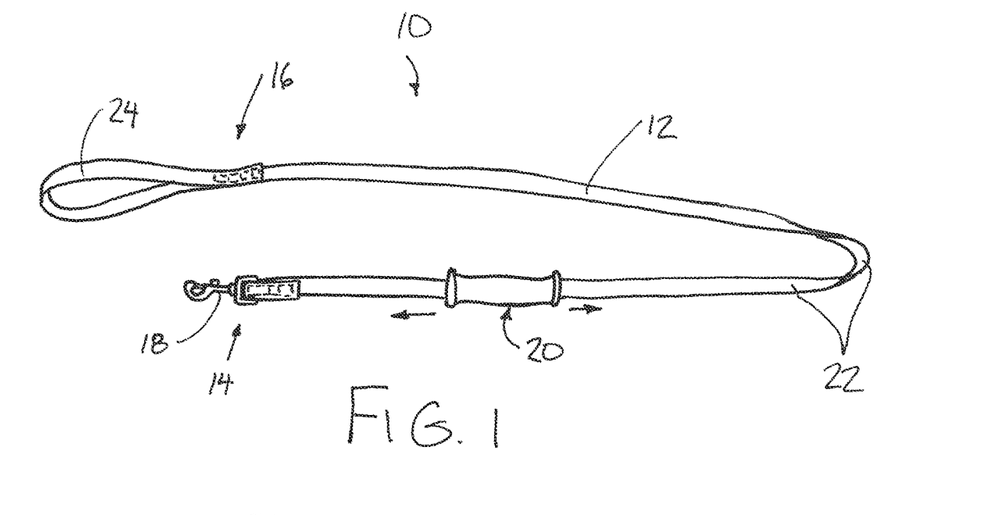
FIG. 1 is a schematic representation of the animal leash according to the present invention.
Figure 2:
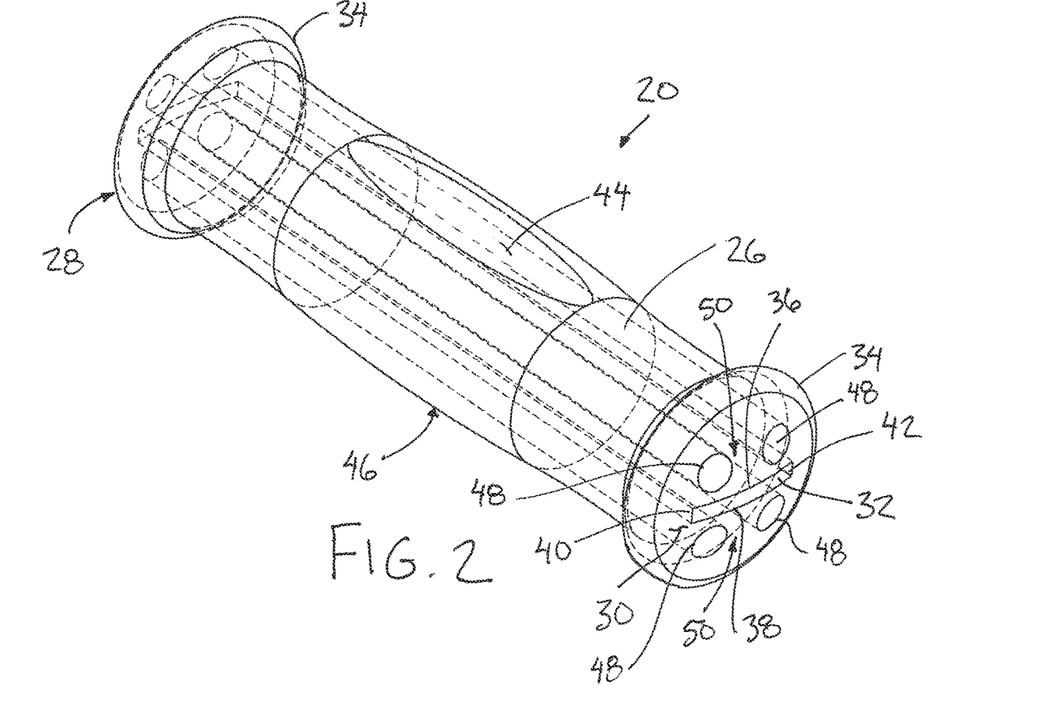
FIG. 2 is a perspective view of the grip handle of the leash according to FIG. 1.
Figure 3:
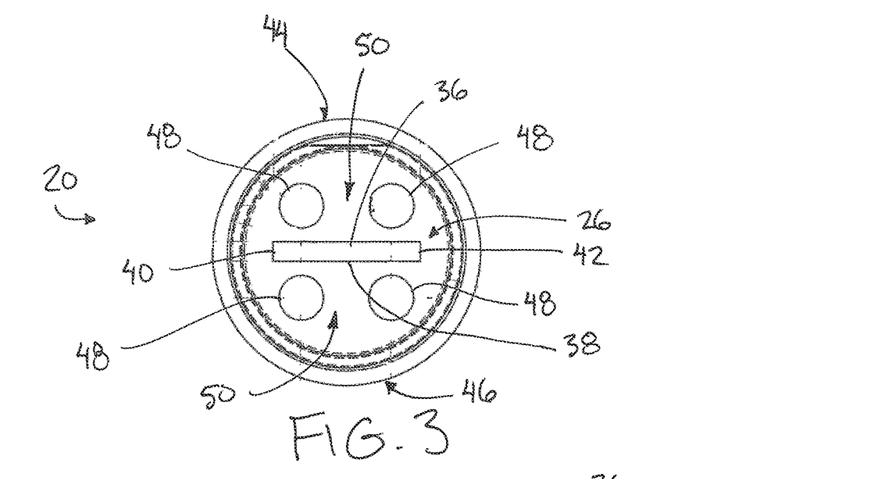
FIG. 3 is an end view of the grip handle of the leash according to FIG. 1.
Figure 4:
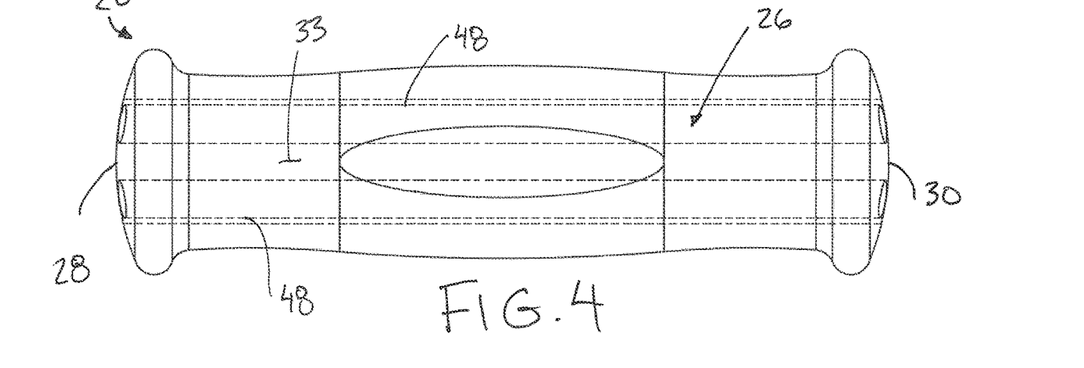
FIG. 4 is a top plan view of the grip handle of the leash according to FIG. 1.
Figure 5:
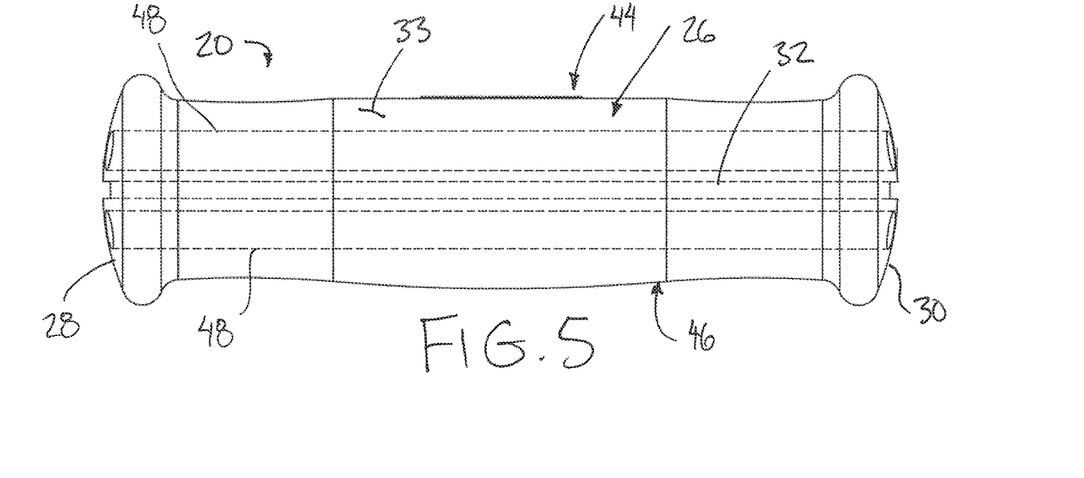
FIG. 5 is a side elevational view of the grip handle of the leash according to FIG. 1.
Figure 6:
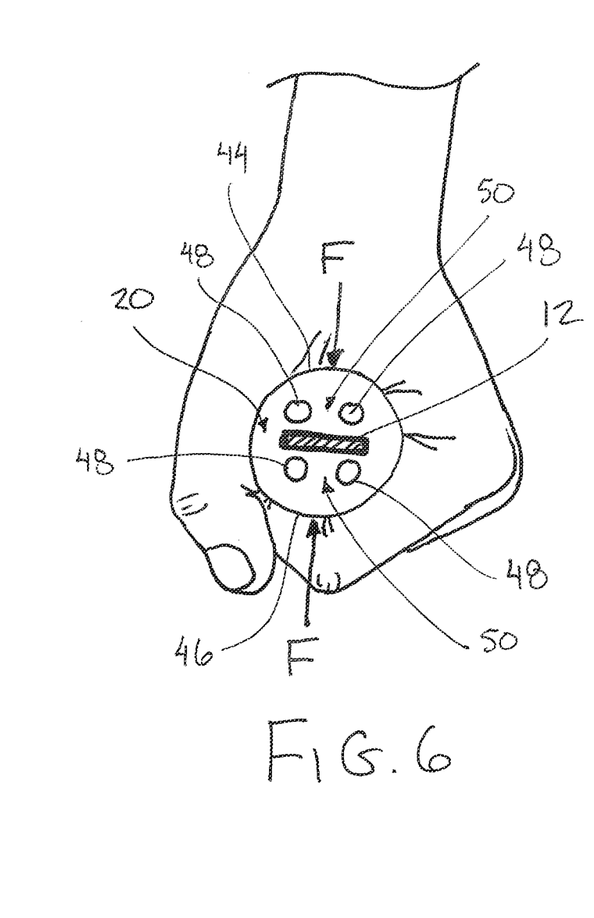
FIG. 6 is a schematic end view of the grip handle gripped in a hand of a user.

When gripped in a hand of the user according to FIG. 6, or in any other orientation that results in a circumferential constriction so as to produce a radially inward compression on the grip handle, a gripping force F is applied to compress the grip handle radially inward from opposing top and bottom grip portions 44 and 46 of the outer surface of the main body. The top and bottom grip portions 44 and 46 are situated at diametrically opposing sides of the main body at corresponding opposing major sides of the leash passage 32.

Figure 7:
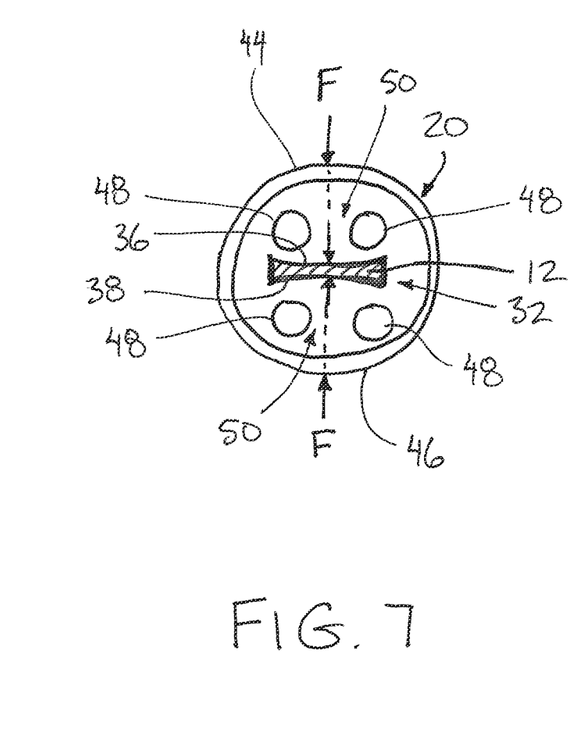
FIG. 7 is a schematic representation of the leash passage collapsed by a gripping force to grip the flexible line of the leash according to FIG. 1.

Application of the gripping force F against the opposing top and bottom grip portions 44 and 46 acts to apply a corresponding compressive force to the major inner surfaces 36 and 38 of the leash passage 32 so that the major inner surfaces collapsed inwardly towards one another for pinching and securely gripping the flexible line 12 therebetween by engaging the opposing flat surfaces 22 of the line 12. In this manner, the leash passage is sized relative to the flexible line such that the main body is operable between an uncompressed state shown in FIG. 6 in which the grip handle is readily slidable along the flexible line received through the leash passage and a compressed state shown in FIG. 7 in which the first major inner surface is flexed inwardly towards the second major inner surface relative to the uncompressed state whereby the grip handle is fixed and secured relative to the flexible line in the compressed state as a result of the material bridge connecting the first major inner surface to said first grip portion of the outer surface to transfer the radially compressive force applied to the grip portion through the material bridge to the major inner surface.

To optimize the transmission of the gripping force F to the major inner surfaces 36 and 38, the main body 26 further includes one or more sets of cavities 48 formed integrally within the main body as described in the following.

As shown in the preferred embodiment of FIGS. 1 through 7, two sets of the cavities are provided such that (i) one set of two cavities 48 is provided in the main body in the area between the first major inner surface 36 and the top grip portion 44 of the outer surface of the grip handle and (ii) a second set of two cavities 48 is provided in the main body in the area between the second major inner surface 38 and the bottom grip portion 46 of the outer surface of the grip handle.

Within each set of cavities, each of the cavities 48 comprises a bore which is elongate in the longitudinal direction to span the full length of the main body 26 between the opposing ends 28 and 30 thereof. In this instance the cavities span across a central portion of the main body between both ends, as well as spanning both ends portions of the main body adjacent to the opposing ends 28 and 30 respectively. The cavities 48 are circular in cross-section perpendicular to the longitudinal direction in the illustrated embodiment, while being open at both ends 28 and 30 to the exterior of the main body.

The cavities 48 are spaced apart from one another in the lateral direction by a distance which is less than the width of the leash passage 32 in the lateral direction. In this manner, the cavities remain within opposing lateral boundaries of the leash passage.

Also within each set of cavities, the two cavities 48 are spaced apart in the lateral direction to define a material bridge 50 between the cavities. The material bridge 50 comprises a solid and continuous portion of the resilient material of the main body which extends radially outward from the respective major inner surface of the leash passage 32 to the respective grip portion of the outer surface of the main body along the full length of the leash passage 32 in the longitudinal direction. The cavities 48 within each set of cavities are positioned relative to the leash passage such that the material bridge 50 formed between the cavities is centrally aligned in the lateral direction relative to the corresponding major inner surface 36 or 38 of the leash passage 32.

Due to the continuous material bridge 50 which is narrower in width in the lateral direction than the leash passage 32 and centrally located in the lateral direction relative to the leash passage, a compressive gripping force F applied to the corresponding grip portion 44 or 46 of the outer surface of the grip handle is transferred radially inwardly through the material bridge 50 to a laterally centred location on the corresponding major inner surface 36 or 38 for deforming a central portion of the major inner surface to bend inwardly. The cross-sectional shape of the leash passage 32 is thus deformed into an hourglass shape for securely pinching and gripping the flexible line 12 between central portions of the opposing major inner surfaces 36 and 38 of the leash passage when it is desired to grip the handle 20 at a fixed and secure location along the line 12. Upon releasing of the gripping force F, the leash passage 32 resiliently returns to a rectangular cross-sectional shape allowing the grip handle to be readily displaced along the length of the line by overcoming small frictional forces between the grip handle and the line when no gripping force is applied.

The cavities within the main body also allow the main body to be more easily bent at an intermediate location along the length thereof as an alternative method of collapsing the leash passage about the flexible line to grip the flexible line passing through the main body. In this instance, the grip handle is bent about an axis extending in the lateral direction perpendicular to the longitudinal direction of the leash passage so that the longitudinal direction at one end of the main body is angularly offset from the longitudinal direction at the other end of the main body.

Figure 8:
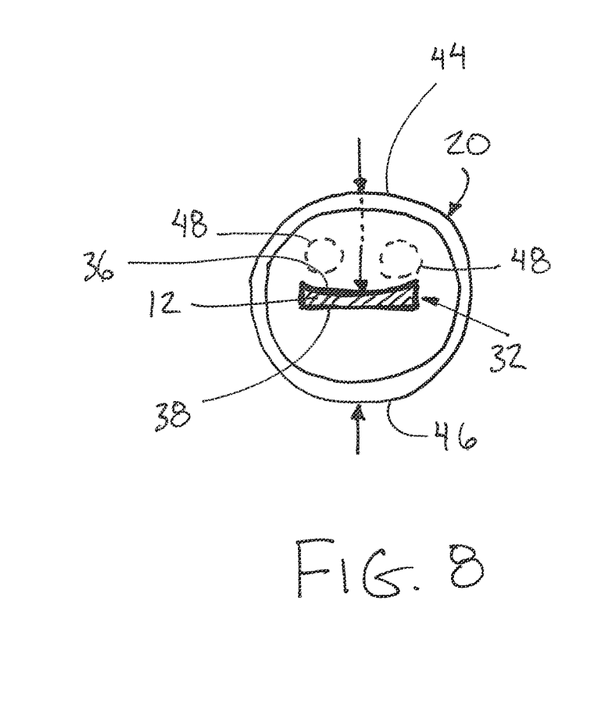
FIG. 8 is a schematic end view of the grip handle according to a second embodiment of the animal leash.
Figure 9:
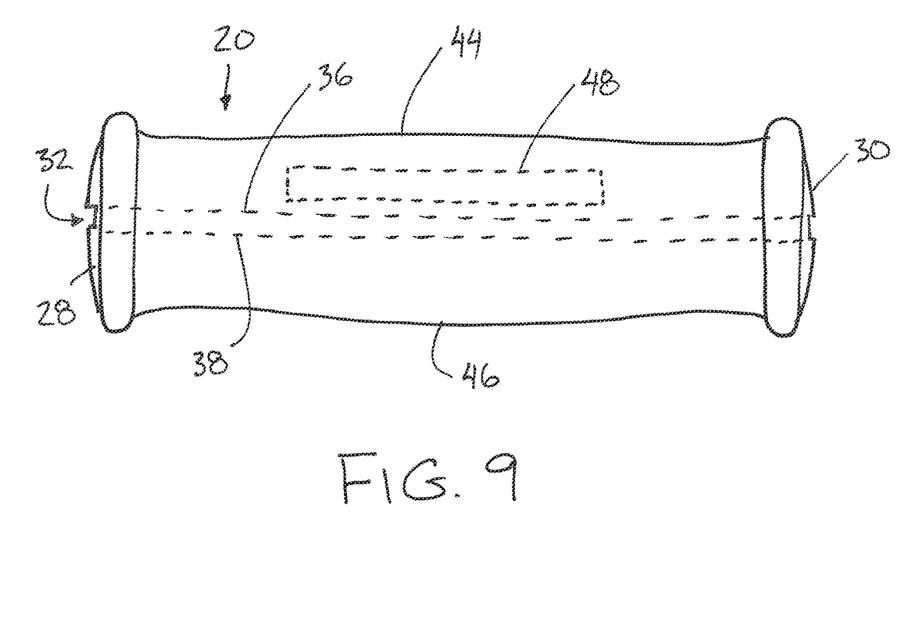
FIG. 9 is a schematic side elevational view of the grip handle according to the second embodiment of FIG. 8.

Alternatively, as shown in the embodiment of FIGS. 8 and 9, a single set of cavities 48 may be provided only within the area between the first major inner surface 36 and the corresponding grip portion 44 of the outer surface of the grip handle. In this instance, a material bridge 50 is again defined between the two cavities 48 such that a gripping force F applied externally to the opposing top and bottom grip portions 44 and 46 primarily acts to focus the gripping force at the first major inner surface 36 for bending and collapsing the first major inner surface inwardly toward the other major inner surface as shown in FIG. 8.

As further shown in the embodiment of FIGS. 8 and 9, the cavities 48 can also be varied such that they extend longitudinally only over part of the overall length of the grip handle in the longitudinal direction. In the illustrated example, the cavities 48 extend longitudinally only across the central portion of the grip handle so as to be closed at both ends relative to the opposing ends of the main body 26. Alternatively, the cavities may be penetrated partway along the length of the main body from one of the ends such that the cavities remain open to one end of the main body.

In further embodiments, the cross-sectional shape of the cavities may take various forms, including a square cross-section, a rectangular cross-section, a triangular cross-section, or other shapes as may be desired.

In the preferred embodiment, the resilient material forming the main body 26 has a durometer measured on the Shore A hardness scale that is between 60 and 70, and more preferably is approximately 65.

Furthermore, the resilient material of the main body has a coefficient of friction relative to the flexible line extending through the main body that is between 0.25 and 0.75.

Optional features of the animal leash include a padded loop handle, a reflective ribbon leash, a control grip handle with a flat smooth channel and 4 integral cavities. The grip handle is adjustable up and down the length of the leash and is not stationary. The control handle preferably has a substantially consistent thickness and no variations of a thick/thin end to be squeezed. The leash ends will be preferably stitched. The handle preferably engages the entire hand to grip the line of the leash. The grip handle is preferably cylindrical and ergonomically comfortable to hold with a lip at each end of the control handle and a bulge in the centre.

As described herein, according to the preferred embodiment, the animal leash is a premium pet leash with many positive functional features that pet lovers will enjoy. It consists of a 2nd control handle that mitigates rope burn, twisting or chafing of the hands and allows for easy control of the animal. In this instance, the leash is a ¾" wide, flat nylon ribbon with reflective stitching running the length of it. One end is comprised of a padded loop folded onto itself and stitched in place with a fabric logo tag to create the anchor handle. The animal leash has a second friction resistant control grip handle. The control grip handle is a one piece 5" long cylinder with a slight bulge in the centre with a 4" circumference at the widest portion. Each end has a gentle taper and functional contours which provide a lip that the user's hand can butt up against to prevent slipping. The control grip is made with non-toxic, antimicrobial, FDA approved flexible rubber that encases the leash where it contacts the ribbon. The control grip has a smooth flat channel inside that runs the length of the handle and is the same size as the ribbon that threads through it. There are 4 symmetrical holes or cavities bored through the length of the handle adjacent the ribbon channel and these enhance friction and stopping control when squeezed by the user. The control grip handle is freely moveable and easily slides up and down the leash to allow the user to lengthen or shorten the leash to control their animal when it is not being compressed by a gripping force. The placement of the control grip along the leash can be adjusted by the user's own voluntary exertion on it and it remains where it is last placed on the leash. The end of the leash is attached to a spring operated swivel clasp to hook onto a collar or harness and is folded back on to itself and stitched in place.

Features according to a preferred embodiment of the animal leash include: a padded handle for comfort, an ergonomically comfortable round control grip that mimics the body's natural grabbing/gripping hand movement, a large surface area that is easy to grab especially during sudden movements by the animal, a comfortable control handle for a variety of hand sizes, a control handle that is adjustable along the length of the leash, a control handle that is formed of food grade non-toxic anti-microbial FDA approved rubber, a line formed of a ribbon that has a strong tensile strength capable of handling large animals up to 150 kgs, a heavy duty tarnish proof clasp, a reflective ribbon, a red handle coupled with the reflective ribbon that adds a higher visibility safety component, a control handle that stays in its last placement so it's easy to reach, a leash that is suitable for owners with long or shorter arm spans, a grip handle that requires very little pressure to engage the handle with the line of the leash, one hand or two handed operation capability, a control handle that allows the user to hold the leash in a variety of positions whatever is most comfortable to the user such as overhand, underhand or hammer style, a left or right handed use, a control grip that uses the entire hand strength when squeezed rather than just a thumb/specific digit, stitched ribbon ends and few metal parts (other than the clasp) for pet safety, a control handle that is integrated onto the leash lead and allows the user to pull the animal in close such that there is no slack or extra length like leashes with extra loop handles, and non-slip rubber surfaces. The leash may be available in different colorfast colors, of durable material, with the options of decorative prints, printed words/sayings, connection to 2 or more dogs, and waist ties for runners.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An animal leash for gripping by a user to restrain an animal, the assembly leash comprising:
   a flexible line extending in a longitudinal direction of the line between a first end and a second end;
   a connector mounted on the first end of the flexible line for attachment to the animal;
   a grip handle supported on the flexible line at an intermediate location between the first end and the second end of the flexible line, the grip handle comprising:
      a main body which is elongate in the longitudinal direction of the flexible line between opposing ends of the main body;
      the main body being formed of a resilient material;
      the main body including an outer surface having a first grip portion and a second grip portion at opposing sides of the main body so as to be arranged to be gripped in a hand of the user;
      a leash passage extending longitudinally through the main body between the opposing ends of the grip handle and receiving the flexible line extending longitudinally therethrough;
      the leash passage having a first major inner surface and a second major inner surface in close proximity with opposing sides of the flexible line respectively, the first major inner surface and the second major surface spanning in a lateral direction between laterally opposing sides of the leash passage;
      the leash passage being sized relative to the flexible line such that the main body is operable between an uncompressed state in which the grip handle is readily slidable along the flexible line received through the leash passage and a compressed state in which the first major inner surface is flexed inwardly towards the second major inner surface relative to the uncompressed state whereby the grip handle is fixed and secured relative to the flexible line in the compressed state;
      two cavities formed internally within the main body at a location between the first major inner surface of the leash passage and said first grip portion of the outer surface of main body;
      the two cavities being spaced apart from one another in said lateral direction so as to define a material bridge in which the material bridge is situated laterally between the two cavities;
      the material bridge extending radially outward from the first major inner surface to said first grip portion of the outer surface; and
      the material bridge connecting the first major inner surface of the leash passage to said first grip portion of the outer surface whereby a radially compressive force applied to said first grip portion of the outer surface of the main body is transferred through the material bridge to the first major inner surface so as to resiliently collapse the first major inner surface of the leash passage towards the second major inner surface of the leash passage from the uncompressed state to the compressed state and thereby to grip the flexible line between the first and second major inner surfaces of the leash passage in the compressed state;

wherein the resilient material of the main body extends continuously radially outward along the material bridge from the first major inner surface of the leash passage to the first grip portion of the outer surface of the main body.

2. The animal leash according to claim 1 wherein the cavities are elongate in the longitudinal direction.

3. The animal leash according to claim 1 wherein the cavities span across a central portion of the main body which is centrally located between the opposing ends of the main body in the longitudinal direction.

4. The animal leash according to claim 1 wherein the cavities span a majority of a length of the grip handle in the longitudinal direction.

5. The animal leash according to claim 1 wherein the cavities span a full length of the grip handle in the longitudinal direction.

6. The animal leash according to claim 1 wherein the cavities are open to at least one of the opposing ends of the main body.

7. The animal leash according to claim 1 wherein the cavities are open to both of the opposing ends of the main body.

8. The animal leash according to claim 1 wherein the bridge of material between the two cavities is laterally centered relative to the first major inner surface.

9. The animal leash according to claim 1 further comprising:
two cavities formed within the main body at a location between the second major inner surface of the leash passage and the second grip portion of the outer surface of main body so as to define a second material bridge extending radially outward from the second major inner surface to said second portion of the outer surface;
whereby a second radially compressive force applied to said second portion of the outer surface of the main body is transferred through the second material bridge to the second major inner surface so as to collapse the second major inner surface of the leash passage towards the first major inner surface of the leash passage to grip the flexible line between the first and second major inner surfaces of the leash passage.

10. The animal leash according to claim 1 wherein the leash passage is rectangular in cross section such that the first and second major inner surfaces are parallel to one another.

11. The animal leash according to claim 10 wherein the flexible line is a flat ribbon having flat surfaces at said opposing sides of the flexible line, the flat surfaces having a width in the lateral direction which is equal to a width of the major inner surfaces of the leash passage.

12. The animal leash according to claim 1 wherein the outer surface of the main body is circular in a cross sectional plane perpendicular to the longitudinal direction.

13. The animal leash according to claim 1 wherein the cavities are circular in a cross sectional plane perpendicular to the longitudinal direction.

14. The animal leash according to claim 1 wherein the main body is formed of rubber.

15. The animal leash according to claim 1 wherein the resilient material of the main body has a durometer measured on the Shore A Scale of between 60 and 70.

16. The animal leash according to claim 1 wherein the resilient material of the main body has a durometer measured on the Shore A Scale of 65.

17. The animal leash according to claim 1 wherein the resilient material of the main body has a coefficient of friction relative to the flexible line of between 0.25 and 0.75.

* * * * *